(12) United States Patent
Hixenbaugh et al.

(10) Patent No.: US 11,497,963 B2
(45) Date of Patent: *Nov. 15, 2022

(54) GOLF EQUIPMENT IDENTIFICATION AND FITTING SYSTEM

(71) Applicant: Acushnet Company, Fairhaven, MA (US)

(72) Inventors: Chris Hixenbaugh, North Dartmouth, MA (US); Nicholas M. Nardacci, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 228 days.

This patent is subject to a terminal disclaimer.

(21) Appl. No.: 17/014,810

(22) Filed: Sep. 8, 2020

(65) Prior Publication Data

US 2020/0406100 A1 Dec. 31, 2020

Related U.S. Application Data

(63) Continuation of application No. 16/193,858, filed on Nov. 16, 2018, now Pat. No. 10,799,759.

(51) Int. Cl.
*A63B 24/00* (2006.01)
*A63B 69/36* (2006.01)
*A63B 102/32* (2015.01)

(52) U.S. Cl.
CPC ...... *A63B 24/0021* (2013.01); *A63B 24/0003* (2013.01); *A63B 69/3614* (2013.01); *A63B 69/3605* (2020.08); *A63B 2024/0034* (2013.01); *A63B 2102/32* (2015.10); *A63B 2220/10* (2013.01); *A63B 2220/805* (2013.01); *A63B 2220/83* (2013.01); *A63B 2220/89* (2013.01); *A63B 2225/50* (2013.01)

(58) Field of Classification Search
CPC ........ H04N 7/188; G01S 13/58; G01S 13/867
See application file for complete search history.

(56) References Cited

U.S. PATENT DOCUMENTS

| | | |
|---|---|---|
| 10,799,759 B2 | 10/2020 | Hixenbaugh |
| 2006/0247070 A1 | 11/2006 | Funk |
| 2013/0304417 A1 | 11/2013 | Mooney |
| 2014/0156040 A1 | 6/2014 | Mooney |
| 2016/0360378 A1* | 12/2016 | Borowski ......... H04M 1/72412 |
| 2018/0200605 A1 | 7/2018 | Syed |
| 2019/0224528 A1* | 7/2019 | Omid-Zohoor ...... A61B 5/0024 |

* cited by examiner

*Primary Examiner* — Reginald A Renwick

(57) ABSTRACT

Systems and methods for identifying golf equipment. The system may include one or more performance tracking devices, such as an optical sensor system or a radar sensor system for tracking at least one of a golf club swing or a golf ball flight. The system also may include at least one processor and memory storing instructions that, when executed by the at least one processor, cause the system to perform a set of operations. The operations include receiving current dynamic input for a golf shot from a golfer and current static input for the golfer. The operations also include executing a trained machine-learning model based on the received current dynamic input and current static input to generate predicted golf club properties and/or predicted golf ball properties for the golfer. The predicted golf club properties and/or predicted golf ball properties are displayed on a connected display.

20 Claims, 5 Drawing Sheets

GOLF EQUIPMENT IDENTIFICATION AND FITTING SYSTEM

RELATED APPLICATION

This application is a continuation of and claims priority to U.S. patent application Ser. No. 16/193,858 filed on Nov. 16, 2018, which is hereby incorporated by reference in its entirety.

BACKGROUND

Having the proper equipment to play any sport can be a factor in how well an athlete will perform. For example, proper equipment in the sport of golf may allow a golfer to hit the golf ball longer, straighter, and more consistently—thus improving the golfer's performance and overall score. Fitting the proper equipment for a golfer, however, has become increasingly difficult. As the available types and adjustability of golf clubs have grown, configurations for such golf clubs have become increasingly complex. For instance, modern drivers, fairway metals, and hybrid clubs frequently have adjustable components, such as adjustable weights or hosel systems, that allow a golfer to more finely tune the golf club to best fit the golfer's own swing characteristics. The number of features and characteristics that can be tracked for a golfer's swing have also dramatically increased. Accordingly, determining proper equipment and settings for each individual golfer is a particularly difficult task.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods identification of golf equipment for a golfer through the use of trained machine-learning technology. In an aspect, the technology relates to a system for identifying golf equipment. The system includes one or more performance tracking devices, wherein the one or more performance tracking devices include at least one of an optical sensor system or a radar sensor system for tracking at least one of a golf club swing or a golf ball flight, wherein the one or more performance tracking devices are configured to generate at least one of golf club swing characteristics of the golf club swing or golf ball flight characteristics of the golf ball flight. The system also includes a display operatively connected to the one or more performance tracking devices; at least one input device for receiving static input; and at least one processor and memory operatively connected to the one or more performance tracking devices, the display, and the at least one input device. The memory stores instructions that, when executed by the at least one processor, cause the system to perform a set of operations. The set of operations include receive, from the one or more performance tracking devices, first current dynamic input for a first golf shot from a golfer, wherein the first current dynamic input includes the at least one of the golf club swing characteristics or the golf ball flight characteristics for the first golf shot; and receive, via the at least one input device, current static input for the golfer, wherein the current static input is at least one of a golfer characteristic or a golf-equipment characteristic. The set of operations also include execute a trained machine-learning model based on the received first current dynamic input and current static input to generate at least one of first predicted golf club properties or first predicted golf ball properties for the golfer, wherein the trained machine-learning model has been trained from a set of prior dynamic inputs, prior static inputs, and at least one of prior golf club swing characteristics or prior golf ball flight characteristics; and display, on the display, the at least one of the first predicted golf club properties or the first predicted golf ball properties for the golfer.

In an example, the one or more performance tracking devices include at least one of a swing tracker or a ball-flight tracker. In another example, the one or more performance tracking devices include at least one of a swing tracker or a ball-flight tracker. In yet another example, the current static input includes the golfer characteristic, wherein the golfer characteristic includes at least one of gender, height, weight, age, handicap, handedness, arm length, or hand size. In still another example, the current static input includes the golf-equipment characteristic, wherein the golf-equipment characteristic includes at least one of club head model, club head lie, club head loft, club head adjustable settings, club head grind, club head bounce, shaft flex, shaft length, shaft torque, grip size, golf ball model, golf ball compression, golf ball cover material, or golf ball number of layers. In still yet another example, the first current dynamic input includes golf club swing characteristics, the golf club swing characteristics including at least one of swing data of the golf club, force data, motion-capture data, or electromyography data.

In another example, the swing data of the golf club includes at least one of club speed, attack angle, path, dynamic loft, face angle, droop, face and loft spin, or impact location; the force data includes at least one of vertical force left foot, vertical force right foot, vertical weight shift, vertical force magnitude, toe force, heel force, torque right foot, torque left foot, torque, center of pressure, center mass, or moment arm; the motion-capture data includes at least one of wrist rotation, hip angle, hip translation, torso angle, torso translation, spine rotation, or upper body position; and the electromyography data includes at least one of leg muscle group electromyography data, torso muscle group electromyography data, arm muscle group electromyography data, integrated electromyography data, root-mean square electromyography data, peak amplitude electromyography data, or median power frequency electromyography data. In yet another example, the golf club swing characteristics include the swing data of the golf club, the force data, and the motion-capture data. In still another example, the set of operations further includes: receive, from the one or more performance tracking devices, second current dynamic input for a second golf shot from a golfer, wherein the second shot from the golfer is with at least one of a golf club having the first predicted golf club properties or a golf ball having the first predicted golf ball properties; update the current static input for the golfer based on the at least one of the golf club having the predicted golf club properties or the golf ball having the first predicted golf ball properties; execute the trained machine-learning model based on the received second current dynamic input and the updated current static input to generate at least one of second predicted golf club properties or second predicted golf ball properties for the golfer; and display, on the display, the at least one of the second predicted golf club properties or the second predicted golf ball properties for the golfer. In still yet another example, the set of operations further includes reinforcing the trained machine-learning model based on the at least two or more of the received current static input, the updated current static input, the first current dynamic input, the second current dynamic input, the first predicted golf club properties, the second predicted golf properties, the first predicted golf ball properties, or the second predicted golf ball properties.

In another example, the set of operations further includes: receiving, via the at least one input device, confirmation input confirming one or more of the first predicted golf club properties, the second predicted golf properties, the first predicted golf ball properties, or the second predicted golf ball properties; and wherein the reinforcing of the trained machine-learning model is further based on the confirmation input. In yet another example, the set of operations further includes: receiving, via the at least one input device, rejection input rejecting one or more of the first predicted golf club properties, the second predicted golf properties, the first predicted golf ball properties, or the second predicted golf ball properties; and wherein the reinforcing of the trained machine-learning model is further based on the rejection input. In still yet another example, the input device is a touchscreen of the display.

In another aspect, the technology relates to a method, executed by one or more processors, for identifying golf equipment. The method includes receiving static input, via an input device operatively connected to the one or more processors, wherein the static input is at least one of a golfer characteristic or a golf-equipment characteristic; and receiving, from one or more performance tracking devices, first current dynamic input for a first golf shot from a golfer, wherein the first current dynamic input includes at least one of golf club swing characteristics or golf ball flight characteristics for a first golf shot from the golfer. The method further includes executing, by the one or more processors, a trained machine-learning model based on the received first current dynamic input and static input to generate at least one of first predicted golf club properties or first predicted golf ball properties for the golfer, wherein the trained machine-learning model has been trained from a set of prior dynamic inputs, prior static inputs, and at least one of prior golf club swing characteristics or prior golf ball flight characteristics; and displaying, on a display operatively connected to the one or more processors, the at least one of the first predicted golf club properties or the first predicted golf ball properties for the golfer.

In an example, the method further includes: receiving, via the input device, a confirmation input confirming one or more of the first predicted golf club properties or the first predicted golf ball properties; and reinforcing the trained machine-learning model based on the confirmation input and at least one of the static input or the first current dynamic input. In another example, the method further includes receiving, via the input device, a rejection input rejecting one or more of the first predicted golf club properties or the first predicted golf ball properties; and reinforcing the trained machine-learning model based on the rejection input and at least one of the static input and the first current dynamic input. In yet another example, the method further includes: receiving, from the one or more performance tracking devices, second current dynamic input for a second golf shot from the golfer, wherein the second shot from the golfer is with at least one of a golf club having the first predicted golf club properties or a golf ball having the first predicted golf ball properties; updating, by the one or more processors, the static input for the golfer based on the at least one of a golf club having the predicted golf club properties or the golf ball having the first predicted golf ball properties; executing, by the one or more processors, the trained machine-learning model based on the received second current dynamic input and the updated static input to generate at least one of second predicted golf club properties or second predicted golf ball properties for the golfer; and displaying, on the display, the at least one of the second predicted golf club properties or the second predicted golf ball properties for the golfer. In still another example, the golfer characteristic includes at least one of gender, height, weight, age, handicap, handedness, arm length, or hand size; the golf-equipment characteristic includes at least one of club head model, club head lie, club head loft, club head adjustable settings, club head grind, club head bounce, shaft flex, shaft length, shaft torque, grip size, golf ball model, golf ball compression, golf ball cover material, or golf ball number of layers; and the golf club swing characteristics include at least one of swing data of the golf club, force data, motion-capture data, or electromyography data. In such an example, the swing data of the golf club includes at least one of club speed, attack angle, path, dynamic loft, face angle, droop, face and loft spin, or impact location; the force data includes at least one of vertical force left foot, vertical force right foot, vertical weight shift, vertical force magnitude, toe force, heel force, torque right foot, torque left foot, torque, center of pressure, center mass, or moment arm; the motion-capture data includes at least one of wrist rotation, hip angle, hip translation, torso angle, torso translation, spine rotation, or upper body position; and the electromyography data includes at least one of leg muscle group electromyography data, torso muscle group electromyography data, arm muscle group electromyography data, integrated electromyography data, root-mean square electromyography data, peak amplitude electromyography data, or median power frequency electromyography data.

In another example, the trained machine-learning model generates an identification of a tour professional that most closely matches the received static input and first current dynamic input. In yet another example, the trained machine-learning model based generates the first predicted golf club properties and first predicted golf ball properties for the golfer.

In another aspect, the technology relates to a method, executed by one or more processors, for training a machine-learning system to identify golf equipment. The method includes aggregating shot data for a plurality of golf shots, wherein the shot data includes: prior static inputs and prior dynamic inputs for the plurality of golf shots; and prior golf equipment fitting data correlated to the prior static inputs and prior dynamic inputs, wherein the golf equipment fitting data includes at least one of prior predicted golf club properties or prior predicted golf ball properties. The method further includes separating the aggregated shot data into a training data set and a test data set; executing a supervised training of a machine-learning model based on the training data set; and testing the trained machine-learning model with the test data set to generate test results. The method further includes determining that the test results from the trained machine-learning model are within a predetermined tolerance; and based on the determination that the test results are within a predetermined tolerance, storing the trained machine-learning model. The method further includes receiving current static input for a live golf shot from a golfer; receiving current dynamic input for the live golf shot from a golfer, wherein the current dynamic input includes the at least one of golf club swing characteristics or golf ball flight characteristics for the live golf shot; executing the trained machine-learning model based on the received current dynamic input and current static input to generate at least one of predicted golf club properties or predicted golf ball properties for the golfer; and displaying the at least one of the predicted golf club properties or the predicted golf ball properties for the golfer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

As discussed above, identifying proper golf equipment for an individual golfer has become increasingly complex and difficult. Not only is each golf club itself different, each golf club may also have interchangeable or adjustable shafts, configurable hosels, adjustable weights, and adjustable dials for changing lie angle, among other adjustment systems. Moreover, golf-swing and ball-flight trackers and monitors are able to capture significantly more data about a golf swing and shot than ever before. Those trackers and monitors, however, are limited in that they are not able to identify equipment for a golfer based on the captured golf-swing or ball-flight characteristics. The present golf equipment identification systems and methods provide for improvements to that technology by enhancing monitoring and tracking systems to identify and predict golf club and ball equipment for the individual golfer who is being monitored or tracked. For example, the present technology integrates golf-swing and ball-flight monitors that utilize an optical sensor system and/or a radar sensor system with machine-learning technology to automatically identify golf equipment for the golfer based on the data captured from the monitors.

Figure 1A:
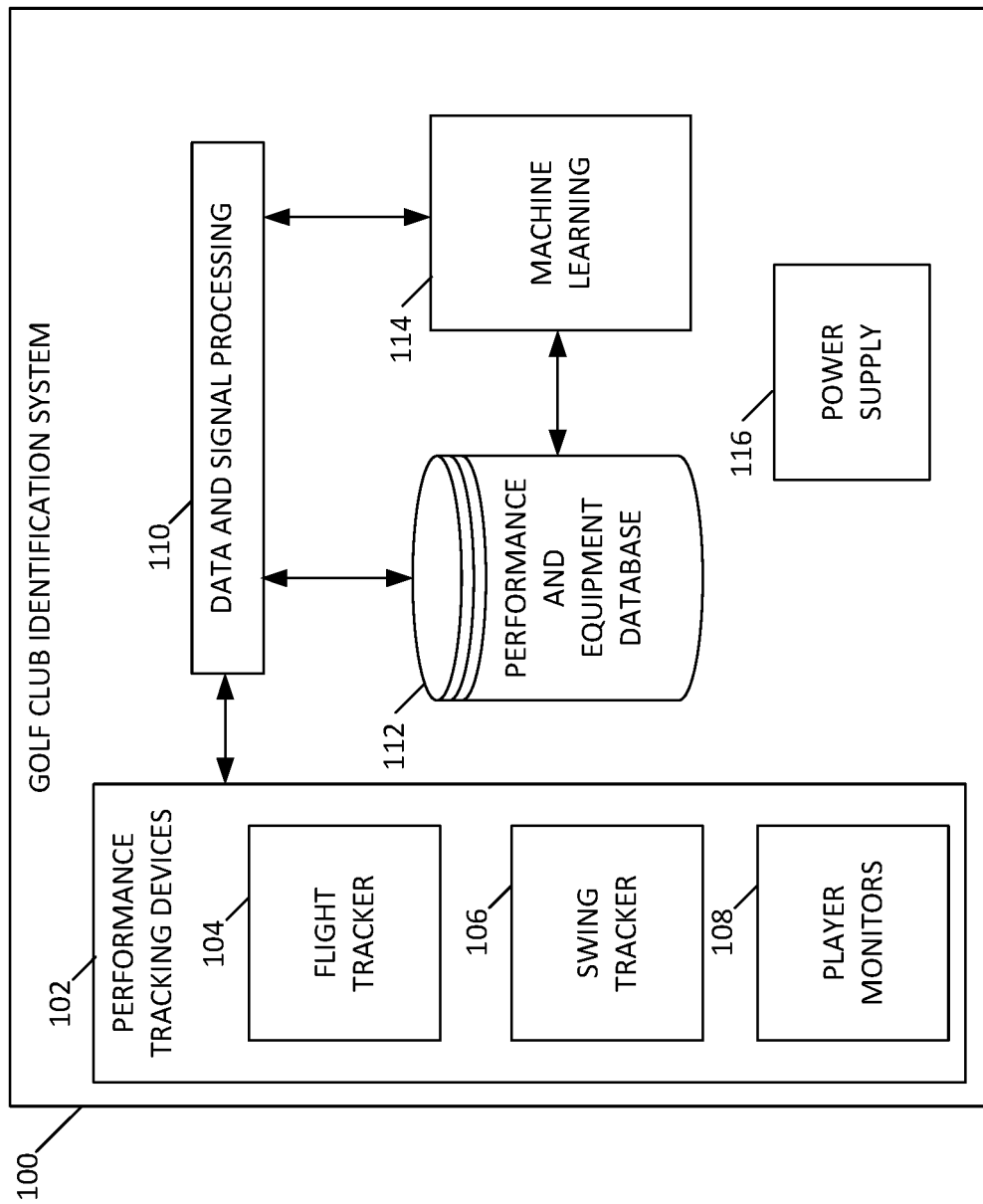
FIG. 1A depicts an example of a golf equipment identification system.

FIG. 1A depicts an example of a golf equipment identification system 100. The golf equipment identification system includes a plurality of performance tracking devices 102. The performance tracking devices 102 are used to track the performance or other characteristics of a golf swing, golf shot, or both. For example, the performance tracking devices 102 may include a ball-flight tracker 104, a golf-swing tracker 106, and other player monitors 108. The ball-flight tracker 104 tracks the flight characteristics of a golf ball struck by the golf club in the detected configuration state. The flight characteristics may include ball speed, trajectory, spin, impact angle, carry, roll, total distance, and other ball-flight characteristics. The swing tracker 106 tracks swing characteristics of the golf club as it is being swung, such as swing path, face angle, club head speed, loft, and other swing characteristics. In some examples, swing tracker 106 and the ball-flight tracker 104 may be provided in the same device. An example of a launch monitor that includes both club-swing and ball-flight tracking capabilities is described in U.S. Pat. No. 7,395,696, titled "Launch Monitor," and assigned to Acushnet Company of Fairhaven, Mass., the entirety of which is incorporated herein by reference. U.S. Pat. No. 7,395,696 also describes suitable interfaces for displaying data obtained by the launch monitor.

The other player monitors 108 may include wearable devices that capture movement or other characteristics of a golfer, such as vests, wrist watches/devices, and other wearable sensors. For example, a wearable electromyography (EMG) sensor may be used. The player monitors 108 may also include one or more motion-capture devices that capture the motion of the golfer during a swing. The motion-capture devices may be inertial, electromagnetic, and/or optical devices capable of capturing motion. Motion-capture devices may also include smart phones, or similar smart devices, that have sensors capable of tracking the motion of a golfer when the smart phone is in the pocket, or worn on the golfer in any fashion. Similarly, optical-motion-capture devices may include a camera, such as a camera in a smart phone or similar device. The player monitors 108 may also include force plates or insole sensors to detect or monitor force on or from each foot of the golfer. The player monitors 108 may be worn by, or otherwise attached to, the golfer and/or the golfer's equipment, such as the golfer's golf bag, golf club(s), or other accessories.

Each of the performance tracking devices 102 generates an output signal representative of the data captured by each of the respective performance tracking devices 102. The performance tracking devices 102 capture or measure physical phenomena, light, heat, motion, moisture, pressure, or other environmental phenomena. For instance, electromagnetic waves in the infrared, visible, and/or radio-frequency spectrum, are captured through optical or other electromagnetic sensors. Sound or pressure waves may also be captured through radar sensors incorporated into the performance tracking devices 102. The performance tracking devices 102 transform those captured physical phenomena into analog and/or digital signals capable of being stored in memory and processed by one or more processors. For instance, the signal may be in the form of modulated voltages that are output from the sensors of the performance tracking devices 102. The output signals from the performance tracking devices 102 are received by the data and signal processing components 110, which may include at least one processor and memory storing instructions for data and signal processing. For instance, data and signal processing components 110 may receive swing data from the swing tracker 106 and ball-flight data from the ball-flight tracker 104. The data and signal processing components 110 may also process images or imaging data from the performance tracking devices 102. The data and signal processing components 110 may process or otherwise convert that received data into a new format suitable for display or input into other components for further processing.

The system 100 also includes a machine-learning model or component 114. The machine-learning component 114 processes dynamic inputs about golf swings and shots and static inputs about a golfer and the golfer's equipment used for the golf shot to identify predicted, optimal golf equipment for the particular golfer. In general, dynamic inputs about golf swings and shots are inputs that are generated from one or more of the performance tracking devices 102. Examples of dynamic inputs include data items such as club speed and ball speed for a particular golf shot. The dynamic inputs may be provided to the machine-learning component 114 by the data and signal processing components 110 after the data and signal processing components 110 process the data received from the performance tracking devices 102. In other examples, the machine-learning component 114 may receive dynamic inputs directly form the performance tracking devices 102. In contrast, static inputs about the golfer or equipment being used may be received through various input methods, including manual entry into the system 100. Examples of static inputs include the golf club model, a golf ball model, and a golfer's height and weight. In some examples, the static inputs regarding golf equipment may be detected and/or received using the methods and systems discussed in U.S. patent application Ser. No. 15/975,553, titled Golf Club Configuration Detection System and assigned to Acushnet Company of Fairhaven, Mass., the entirety of which is incorporated herein by reference. Additional examples of static and dynamic inputs are discussed below with reference to FIG. 2. Based on the dynamic and static inputs, the machine-learning component 114 generates predicted optimal equipment data for the golfer. The predicted equipment data may include predicted, optimal golf club properties and/or predicted, optimal golf ball properties for the golfer.

The system 100 also includes performance and equipment database 112. The database 112 stores data regarding performance information and corresponding equipment information. For example, the database 112 may store aggregated prior-shot data for a plurality of golf shots by a plurality of different golfers. The shot data may include prior static inputs and prior dynamic inputs as well as prior equipment data corresponding to the prior static and dynamic inputs. The prior-shot data may be from prior fitting session of a golfer. For example, a player may meet with a golf professional or fitting specialist to assist in selecting the best club for the golfer. During a fitting session, ball-flight and swing characteristics, among other dynamic inputs, may be recorded. Static inputs may also be tracked. The golf professional or fitting specialist then determines the best golf equipment for that golfer. The dynamic and static inputs may then be stored in the database along with the correlated golf equipment determined by the golf professional or fitting specialist. The dynamic and static inputs may be stored as different arrays within the database. The prior dynamic and static inputs, as well as the correlated prior equipment data, may be stored in the database 112 in different manners depending on the particular implementation or embodiment. In an example, the prior dynamic and static inputs and the correlated prior equipment data may be stored in an object database. In such an example, the database may store a fitting event as an object and store the associated, prior dynamic and static inputs and prior equipment data for each fitting event in the corresponding object. In another example, the prior dynamic and static inputs and the correlated prior equipment data may be stored in a relational database. The prior dynamic and static inputs and the correlated prior equipment data may then be stored in rows and columns such that a particular row and/or column is associated with a particular prior fitting event. Other data storage technologies may also be used, such as hybrid object-relational databases. When a live fitting event is performed using the trained machine-learning model 114, the current dynamic and static inputs may also be stored in the database 112. The predicted golf equipment from the machine-learning model 114 may also be stored in the database 112 as correlated with the stored current dynamic and static inputs.

Each of the components of the golf equipment identification system 100 may be housed or attached to a single housing, and in some examples, that single housing may be portable, such a cart or handheld device. In some examples, the performance tracking devices 118 may be physically separated, but remain operatively connected via a wired or wireless interface, from the remainder of the components of the system 100. The system 100 may also include a power supply 116 to supply power to the components of the system 100. In some examples, the power supply 116 includes a battery and in some examples the power supply 116 may include a power cord for plugging into a traditional power outlet.

Components of the system 100 may also be integrated into portions of a driving range or practice facility. For example, one or more of the performance tracking devices 102 may be integrated into a practice golf mat or directly into the ground of the driving range. The performance tracking devices 118 may also be operatively connected either wirelessly or wired to the remainder of the system 100. The performance tracking devices 118 may also be mounted adjacent a hitting area, such as a golf mat or a segment of a driving range.

Figure 1B:
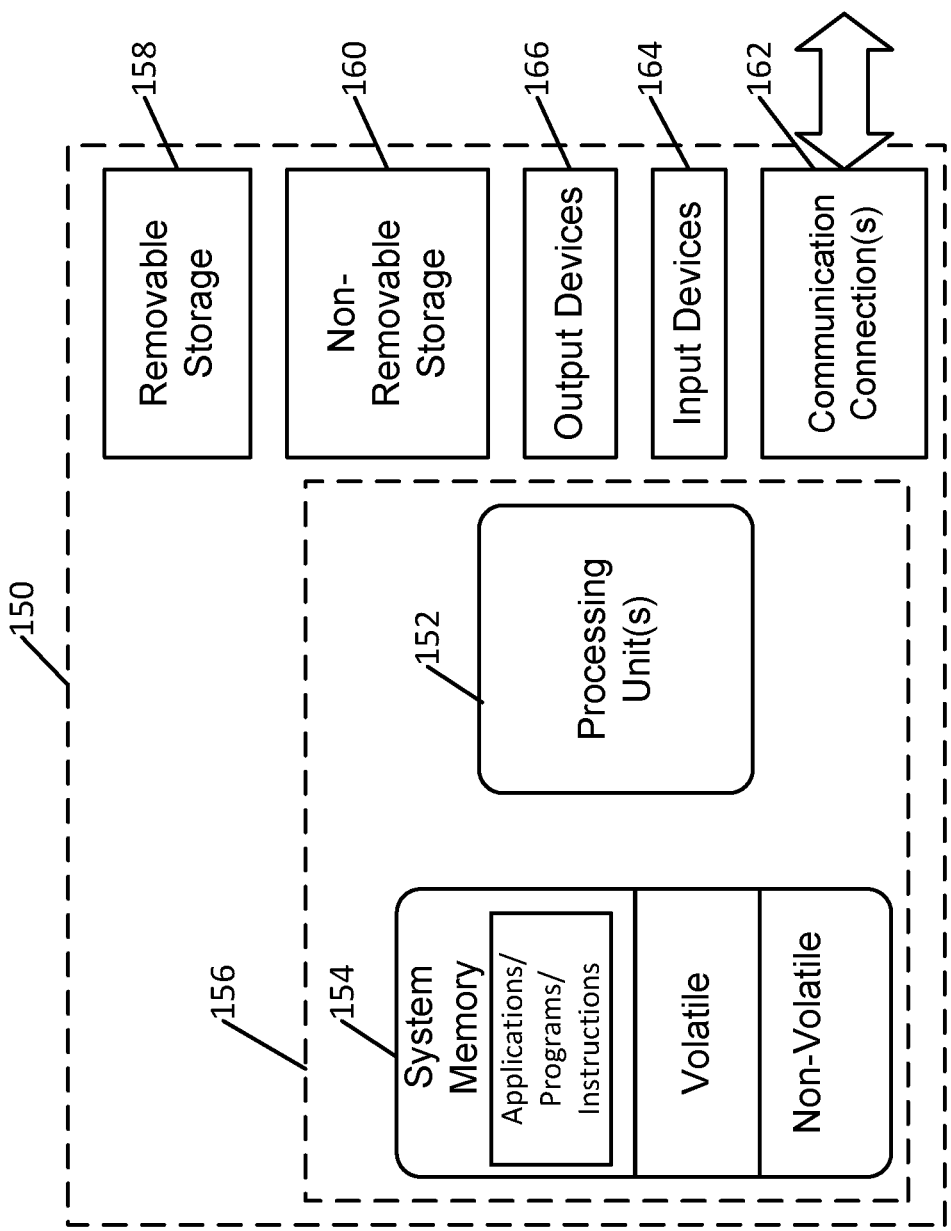
FIG. 1B depicts an example of a suitable operating environment for incorporation into the golf club configuration detection system of FIG. 1A.

FIG. 1B depicts an example of a suitable operating environment 150 for incorporation into the golf equipment identification system 100. For example, the operating environment may be suitable for incorporation and use with the data and signal processing components 110 of the system 100. In its most basic configuration, operating environment 150 typically includes at least one processing unit 152 and memory 154. Depending on the exact configuration and type of computing device, memory 154 (storing instructions to perform the active monitoring embodiments disclosed herein) may be volatile (such as RAM), non-volatile (such as ROM, flash memory, etc.), or some combination of the two. This most basic configuration is illustrated in FIG. 1B by dashed line 156. Further, environment 150 may also include storage devices (removable 158, and/or non-removable 160) including, but not limited to, solid-state storage, magnetic or optical disks or tape. Similarly, environment 150 may also have input device(s) 164 such as keyboard, mouse, pen, voice input, touch input, etc. and/or output device(s) 166 such as a display, speakers, printer, etc. For example, the environment 150 may include a touchscreen that allows for both display and input. The input devices 164 may also include one or more antennas to detect signals emitted from the various the performance tracking devices 102. Also included in the environment may be one or more communication connections 162, such as LAN, WAN, point to point, WIFI, BLUETOOTH, TCP/IP, etc. In embodiments, the connections may be operable to facilitate point-to-point communications, connection-oriented communications, connectionless communications, etc.

Operating environment 150 typically includes at least some form of computer readable media. Computer readable media can be any available media that can be accessed by processing unit 152 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of the any of the above should also be included within the scope of computer readable media.

The operating environment 150 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media.

Figure 2:
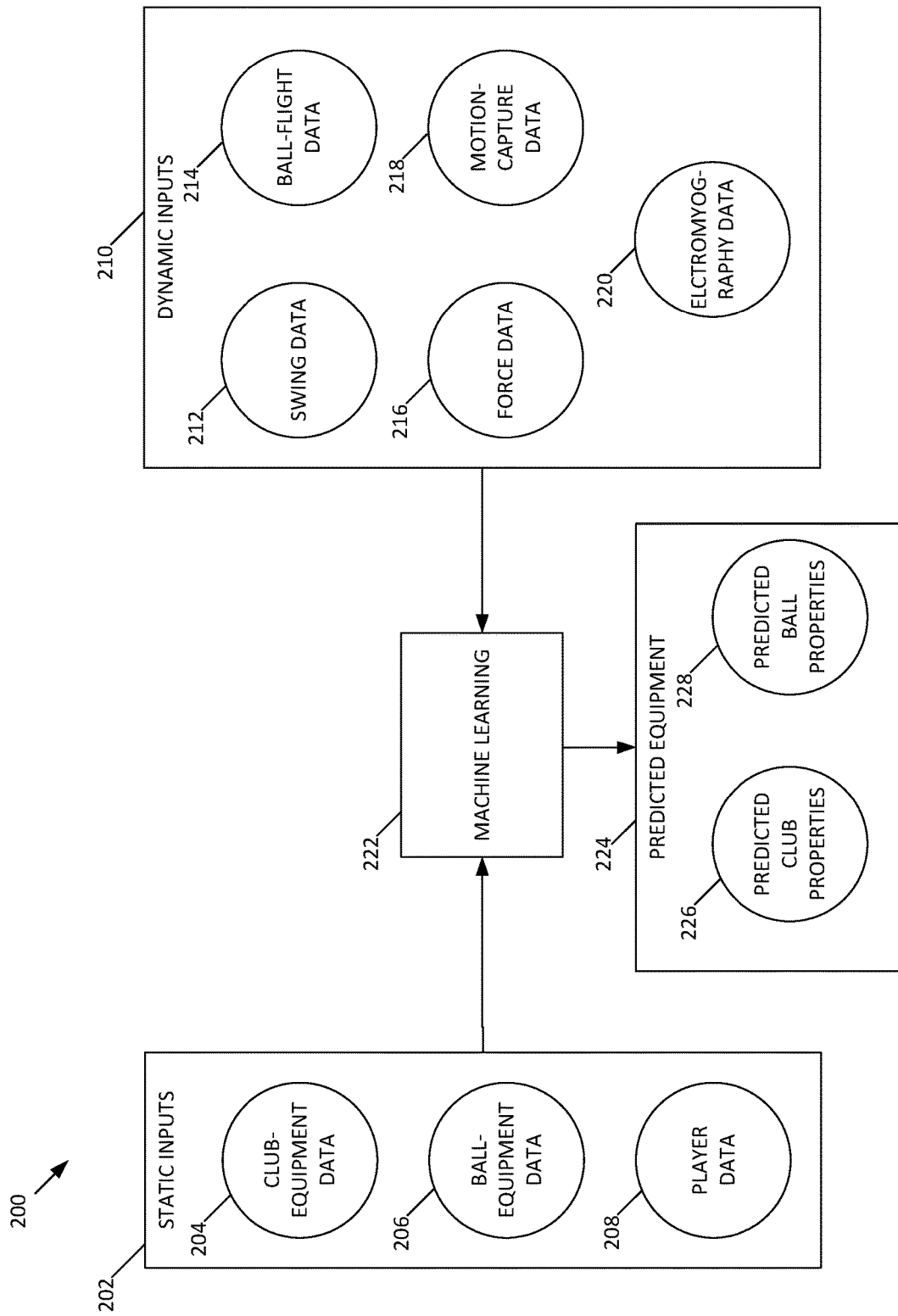
FIG. 2 depicts a visualization of an example machine-learning system for identifying golf equipment for an individual golfer.

FIG. 2 depicts a visualization of an example machine-learning system 200 for identifying golf equipment for an individual golfer. The machine-learning system 200 includes a machine-learning model 222 that has been trained to receive static inputs 202 and dynamic inputs 210 to produce predicted golf equipment 224. In an example, the machine-learning model 222 may be a neural network, such as a deep neural network, that has been trained on prior static and dynamic inputs, prior dynamic inputs, and prior golf equipment recommendations or selections. For example, during supervised training, use of the neural network may include providing a set of prior dynamic and static inputs to the neural network and providing the correlated prior golf equipment fitting data or recommendations. During training, the inputs to the neural networks are the prior dynamic and static inputs and the known output is the correlated prior golf equipment fitting data or recommendations. The neural network processes the inputs and compares the neural network's output to the known output. Weights and/or other properties of the neural network are then adjusted to reduce the error between the network's output and the known output. When the neural network performs within a desired accuracy rate, the trained neural network may be used to produce outputs from input data that has not been previously seen by the neural network and for which there are no known outputs. Different methods may be used for training the neural network, such as the Levenberg-Marquardt algorithm, back-propagation, Newton's method, quasi-Newton, gradient descent, and conjugate gradient, among others. Supervised and/or unsupervised training methods may be used for the initial training of the machine-learning model 222. In addition, while in the above example the machine-learning model 222 is discussed as being a neural network, other types of machine-learning models may also be implemented. For instance, the machine-learning model 222 may include a support vector machine (SVM), k-nearest neighbor, random forest, regression, logistic regression, naïve Bayes classifier, linear discriminant analysis, decision trees; fine grain deep learning, coarse grain deep learning, fuzzy logic, Apriori algorithm, Markov decision process, or gradient boosting process. Additionally, dimensionality reduction methods, such as principal component analysis (PCA) and linear discriminant analysis (LDA), may also be implemented.

The static inputs may include club-equipment data 204, ball-equipment data 206, and player data 208. Static inputs are characteristics that do not change during a golf swing or shot, such as characteristics of the golf equipment used or the golfer. Static inputs may be received through manual entry or automatically detected, as discussed above. The club-equipment data 204 and the ball-equipment data 206 describe golf-equipment characteristics of the golf club and golf ball that are to be used for an upcoming golf shot. The club-equipment data 204 may include characteristics of the golf club used by the golfer to hit a golf shot, such as club head model, club head lie, club head loft, club head adjustable settings, club head grind, club head bounce, shaft flex, shaft length, shaft torque, and/or grip size. The ball-equipment data 206 may include characteristics of the golf ball used by the golfer to hit the golf shot, such as golf ball model, golf ball compression, golf ball cover material, an/or golf ball number of layers. The player data includes golfer characteristics for the golfer hitting the golf shot. The player data 208 may include characteristics of the golfer that hit the golf shot, such as gender, height, weight, age, handicap, handedness, arm length, and/or hand size.

The dynamic inputs may include swing data 212, ball-flight data 214, force data 216, motion-capture data 218, and electromyography data 212. In general, dynamic inputs about golf shots are inputs that are generated from one or more of the performance tracking devices. For example, the performance tracking devices track or monitor the swing of the golf club as the golfer swings the club. The performance tracking devices may also track or monitor the flight of the golf ball when struck by the golf club. The swing data 212 may include club speed, attack angle, path, dynamic loft, face angle, droop, face and loft spin, and/or impact location. The swing data may be captured from a swing tracker. The ball-flight data 214 may include ball speed, launch angle, azimuth angle, spin characteristics (back spin, side spin, and/or rifle spin), carry distance, roll distance, total distance, maximum height, and/or trajectory characteristics. The ball-flight data 214 may be captured from a flight tracker.

Force data 216 may include characteristics of the force exerted by the golfer during a swing including characteristics regarding vertical force left foot, vertical force right foot, vertical weight shift, vertical force magnitude, toe force, heel force, torque right foot, torque left foot, torque, center of pressure, center mass, and/or moment arm. The force data 216 may be captured from player monitors, such as force plates and/or insole sensors. The force data 216 may also include those forces applied by the player on the equipment including shaft forces or rates of loading. The motion-capture data 218 may include characteristics of the motion of the golfer during a swing, including characteristics regarding at least one of wrist rotation, hip angle, hip translation, torso angle, torso translation, spine rotation, and/or upper body position. The motion-capture data 218 may be captured from player monitors, such as motion-capture devices and wearable devices. The electromyography data 220 may include characteristics of the electrical activity of the muscles of the golfer during a swing including characteristics regarding leg muscle group electromyography data, torso muscle group electromyography data, arm muscle group electromyography data, integrated electromyography data, root-mean square electromyography data, peak amplitude electromyography data, and/or median power frequency electromyography data.

Based on the received static inputs 202 and the received dynamic inputs 210 for a golfer and one or more golf swings by the golfer, the machine-learning model 222 generates predicted golf equipment 222 for the golfer. The predicted golf equipment 224 is the golf equipment that is recommended for the golfer based on the static inputs 202 and the dynamic inputs 210. The predicted golf equipment 224 includes predicted golf club properties 226 and/or predicted golf ball properties 228. The predicted golf club properties 226 includes a predicted golf club, or a characteristic of the predicted golf club, that is best suited for the golfer. For example, the predicted golf club properties 226 may include club head model, club head lie, club head loft, club head adjustable settings, club head grind, club head bounce, shaft flex, shaft length, shaft torque, and/or grip size. The predicted golf ball properties 228 include a predicted golf ball, or characteristic(s) of the predicted golf ball, that is best suited for the golfer. For example, predicted golf club properties 226 may include a golf ball model, a golf ball compression, a golf ball cover material, and/or a golf ball number of layers. The predicted equipment 224 generated by the machine-learning model 222 may be delivered to the golfer through multiple different techniques. For instance, the predicted equipment 224 may be presented on a display that is part of a golf-equipment identification system. The predicted equipment 224 may also be sent to a device of the golfer via email, text, or other electronic means.

In some examples, the machine-learning model 222 may also be trained to match a golfer to the closest professional golfer, such a PGA Tour Professional. For instance, the machine-learning model 222 may trained based on a set of static inputs 202 and dynamic inputs 210 for a particular tour professional. The output used for training is the identity of the tour professional for whom the static inputs 202 and dynamic inputs 210 correspond. The training may be performed for a plurality of tour professionals. As such, when a set of live or current static inputs 202 and dynamic inputs 210 are received for a golfer during a fitting session, the machine-learning model 222 is trained to determine the closest match to a tour professional. The generated output from the machine-learning model 222 is thus the closest tour professional to the golfer based on the golfer's static inputs 202 and dynamic inputs 210. The output of the machine-learning model 222 may also provide comparison statistics between the golfer's static inputs 202 and dynamic inputs 210 and the tour professional's static inputs 202 and dynamic inputs 210. The comparison statistics may also include recommendation for changes to the golfer's swing characteristics to more closely match that of the matched tour professional. For example, the comparison statistics may indicate that the that the golfer's swing path, swing plane, and angle of attack is similar to that of the matched tour player, but the tour player has a better dynamic weight shift pattern. A recommendation may be generated for the golfer to adjust his or her dynamic weight shift pattern to more closely match that of the matched tour professional.

In addition, the machine-learning model 222 may also generate predicted equipment 224 for the golfer to more closely attain the swing and shot attributes of the tour professional identified by the machine-learning model 222. The predicted equipment 224 from the machine-learning model 222 may also be based on the equipment used by the matched tour professional. For instance, the equipment of the matched tour professional may be at least part of the basis for the predicted equipment 224 generated by the machine-learning model 222. The equipment of the tour professional may be modified for the generated predicted equipment 224 based on differences between the golfer's swing characteristics and the tour professional's swing characteristics. For instance, if the swing speed of the golfer is less than that of the tour professional, the stiffness of the shaft of the golf club in the predicted equipment 224 may be reduced as compared to the stiffness of the shaft of the tour player's golf club.

Figure 3:
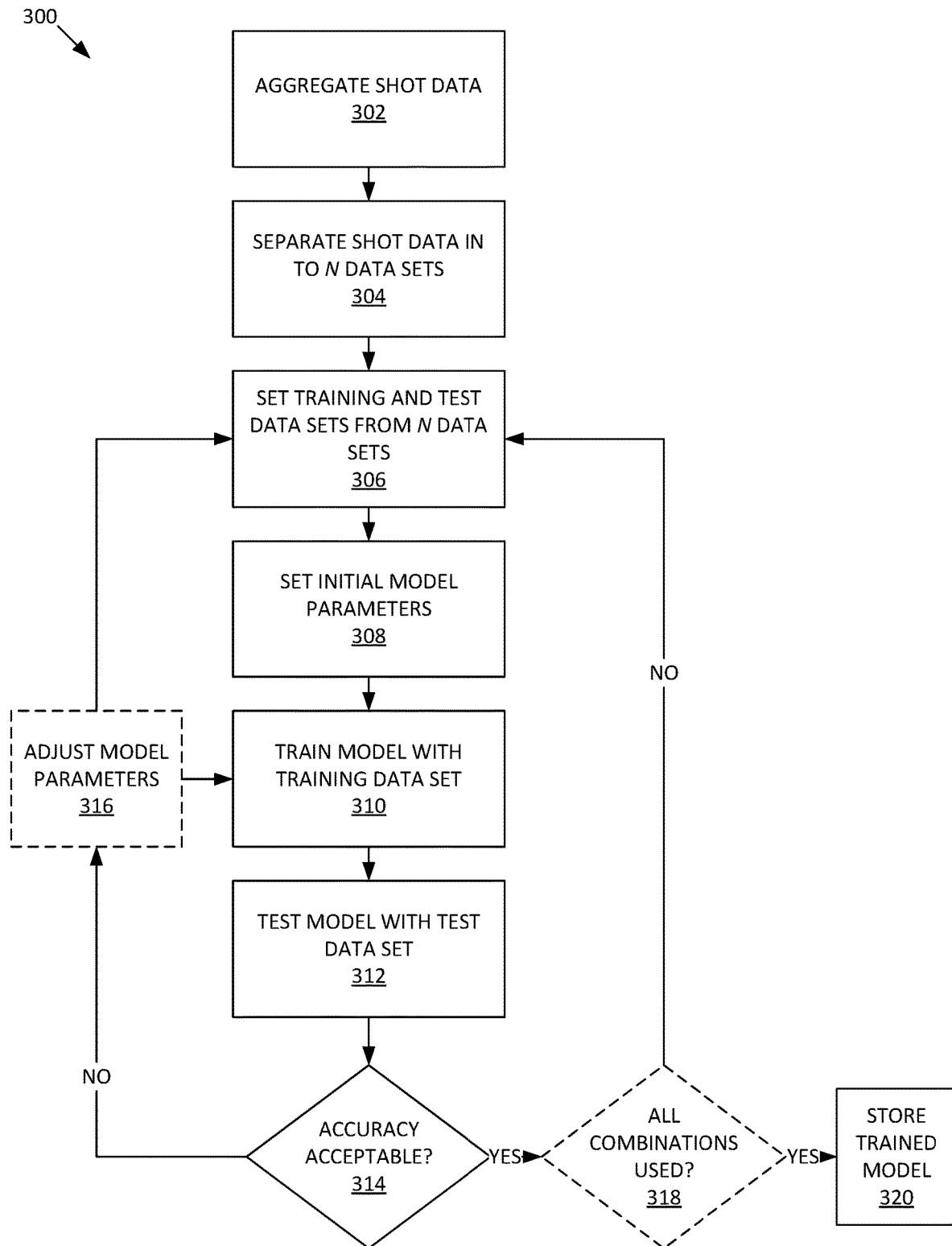
FIG. 3 depicts an example of a method for training a machine-learning system to identify golf equipment for an individual golfer.

FIG. 3 depicts an example of a method 300 for training a machine-learning system for identifying golf equipment for an individual golfer. At operation 302, shot data is aggregated for a plurality of golf shots. The shot data may be for a plurality of prior golf shots by a plurality of different golfers. The shot data includes prior static inputs and prior dynamic inputs for the plurality of golf shots. The prior static inputs and prior dynamic inputs may include any combination of the type of static inputs and dynamic inputs discussed above. The shot data also includes prior golf equipment fitting data that is correlated to the prior static inputs and prior dynamic inputs. That prior golf equipment fitting data includes at least one of prior golf club properties or prior golf ball properties that were provided from a fitting specialist based on the prior static and dynamic inputs. For example, during prior fitting sessions, a fitting specialist may have recommended golf club properties and/or golf ball properties may have been based on a set of static and dynamic inputs. Those recommended or predicted golf club properties and/or golf ball properties are stored or retrieved in a manner such that they remain correlated to the set of static and dynamic inputs on which they were based. Those recommended or predicted golf club properties and/or golf ball properties may be any combination of the types of predicted golf club properties and/or golf ball properties discussed above.

At operation 304, the shot data is separated into N data sets. For example, the shot data may be randomly separated into separate datasets that each have approximately the same amount of data in each data set. At operation 306, a first portion of the data sets may be set as a training data set and another portion of the data sets may be set as a test data set. As an example, the training data set may be N−1 of the separated datasets. The remaining data set may then be used the test data set. Other combinations of data sets are also possible for use as a training and a test data set.

At operation 308, initial model parameters for a machine-learning model may be set. For instance, where the machine-learning model is neural network, initial values for weights and biases may be set. The initial values for the weights and biases may be set based on a randomization function or process. In addition, a particular activation function may be set. As some examples, the activation function may be the sigmoid function, the tanh function, or the RELU function, among other potential options. Other potential parameters of the neural network may also be set with an initial value or type if desired.

Other types of machine-learning models may also be used, as discussed above. The respective parameters of those other machine-learning models may also be initialized at operation 308. For example, a support vector machine (SVM) may be used rather than a neural network. Model parameters of an SVM include parameters such as auto scaling, box constraint, kernel cache limit, kernel function (including linear, quadratic, polynomial, Gaussian radial basis function, multi-layer perceptron, or other similar functions), Karush-Kuhn-Tucker conditions, methods to separate hyperplanes (including quadratic, sequential minimal optimization, least squares, or other optimization methods), parameters of a multi-layer perceptron (if applicable to the kernel), polynomial order (if applicable to the kernel), and a scaling factor to a radial basis function.

At operation 310, the machine-learning model is trained with training data set. For example, operation 310 may include executing a supervised training of the machine-learning model based on the training data set. As an example where the machine-learning model is a neural network, the training may include providing the static inputs and dynamic inputs of the training data set as inputs to the machine-learning model. The static inputs and dynamic inputs are forward propagated through the neural network to produce an output. That output may then be compared to the corresponding prior golf equipment fitting data that is known to the desired result or ground truth. A cost function may then be calculated to reflect the difference between the produced output of the neural network as compared to the ground truth (i.e., the corresponding prior golf equipment fitting data). Back propagation through the neural network may then be performed to determine gradients of the cost function, which can be used to update or adjust the parameters of the neural network. Forward and back propagation may then be repeated with shot data within the training data set until the cost function is minimized or reduced to a desired and/or predetermined limit or tolerance. Other training methods and training variations for training neural networks may also be implemented. Where the machine-learning model is other than a neural network, suitable training techniques may be implemented based on the training data set. For instance, where the machine-learning model is an SVM, training is similar to that of a neural network in that supervised training may also be executed by using the prior static and dynamic inputs as inputs for the SVM during training and using the corresponding prior golf equipment fitting data as the known output.

At operation 312, the machine-learning model as trained in operation 310 is tested with the test data set that was set in operation 306. Testing the machine-learning model may include providing the prior static and dynamic inputs as input to machine-learning model to produce an output in the form of test results. Those test results may then be compared the corresponding prior golf equipment fitting data, such as recommended golf equipment from a fitting specialist, that is correlated with the prior static and dynamic inputs used as input for testing the machine-learning model. Based on the comparison, a difference such as cost function, between the output produced and the corresponding prior golf equipment fitting data may be determined as part of the testing in operation 312. The determined difference is representative of the accuracy of the machine-learning model.

At operation 314, a determination may then be made as to whether the accuracy is acceptable. Determining if the accuracy is acceptable may include determining that the test results from the machine learning module are within a predetermined tolerance. If the accuracy is unacceptable, the method 300 flows to optional operation 316 where the machine-learning model parameters may be further adjusted. For instance, the unacceptable accuracy may be a result of the initial model parameters that were set for the machine-learning model in operation 308. As an example, where the machine-learning model is a neural network, the activation function selected in operation 308 may have produced unacceptable results. In such an example, the activation function may be adjusted in operation 316. The method 300 may then flow back to operation 310 where the machine-learning model may be retrained with the same training data set, but with the adjusted parameter, such as an adjusted activation function. In some examples, the method 300 may instead flow back to operation 306 where new training and test data sets are set from the aggregated shot data. Operations 310-314 are then repeated for the new training data set and the new test data set. Operation 308 may be omitted where the parameters had already been set for the previous training of the machine-learning model. In some examples, operation 316 may be omitted and method 300 may flow directly back to operation 306, where new training and test data sets are set from the aggregated shot data, or operation 310, where training is further performed with the current training and test data sets. In such examples it may be determined that no model parameters need to be adjusted at operation 316. Rather, different training and test data sets are to be used to further improve the accuracy of the machine-learning model.

If the accuracy is determined to be acceptable at operation 314, the method 300 flows to optional operation 318 where a determination is made as to whether all the possible combinations of training data sets and test data sets of the N data sets of the aggregated shot data have been used to train and test the machine-learning model. If not all combinations have been tested, the method flows back to operation 306, where a new, previously unused combination of training and test data sets are set from N data sets. Operations 310-318 are then repeated for the new training data set and the new test data set. Operation 308 may be omitted where the parameters had already been set for the previous training of the machine-learning model. If, at operation 318, all combinations of training and test data have been tested, the method 300 flows to operation 320 where the trained machine-learning model is stored. In some examples, operation 318 may be omitted. For instance, if the accuracy is determined to be acceptable at operation 314, additional combinations may not be used for additional training. The stored, trained machine-learning model may then be used to generate predicted golf equipment properties from live or current static and dynamic inputs.

In some examples, the method 300 may also be used to train the machine-learning model to match a golfer to the closest professional golfer, such a PGA Tour Professional. The operations in method 300 would be similar as discussed above. For instance, at operation 302, a plurality of shot data for a plurality of tour professionals may be aggregated. That shot data may include prior static inputs and prior dynamic inputs for the plurality of golf shots from the different professionals. The corresponding output, or ground truth, for that shot data, however, is the identity of a particular tour professional for which the shot data is associated. That is, the ground truth for training the machine-learning model is the name, or other identifying features, of a tour professional. For example, when the static and dynamic inputs are collected for a set of golf swings by a tour professional, the identity of that tour professional is also stored as correlated with the respective static and dynamic inputs from the tour professional. The aggregated shot data may be separated into N data sets at operation 304 and training and test data sets may be set in operation 306, similar to how such operations were described above. Also similar to the operations described above, initial machine-learning model parameters may be set in operation 308 and the machine-learning model may be trained with the training data set in operation 310. The trained model may also be tested in operation 312, and a determination as to whether the accuracy is acceptable may be determined in operation 314. The accuracy determination may be based on whether the machine-learning model accurately identifies a tour professional based on a test set of static and dynamic inputs. The method 300 may also flow from accuracy determination in operation 314 to either adjust model parameters in operation 316, or otherwise continue with training, or to operation 318 where a determination is made as to whether all the combinations of N data sets have been used for training. Ultimately, the trained machine-learning model is stored at operation 320.

In addition, the shot data for the tour professionals may also be used to further train a machine-learning model to generate predicted golf club properties and/or predicted golf ball properties. For example, it may be presumed that the professional golfer has been precisely fitted to the correct golf equipment. As such, the tour professional's equipment may be used as a heavily weighted ground truth for the static and dynamic inputs of the corresponding tour professional.

Figure 4:
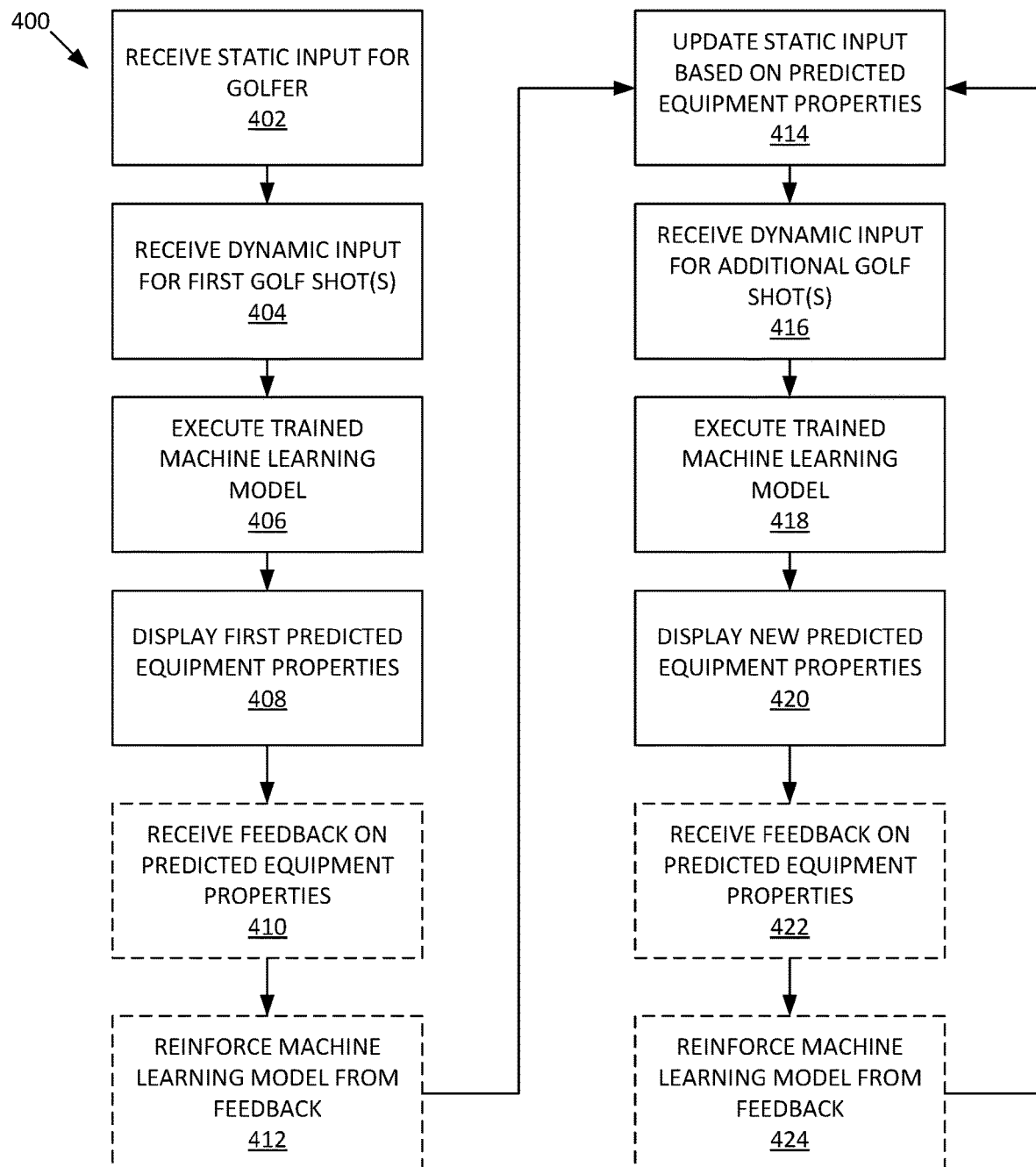
FIG. 4 depicts an example of a method for executing a trained machine-learning system to identify golf equipment for an individual golfer.

FIG. 4 depicts an example of a method 400 for executing a trained machine-learning system to identify golf equipment for an individual golfer. At operation 402, current static input is received for a golfer that is presently participating in a fitting session or preparing to hit golf shots. For example, the current static input may include a golfer characteristic and/or a golf-equipment characteristic. The current static input may include any combination of the static inputs identified above. As also discussed above, the current static input may be received via manual entry, automatic detection, or a combination of the two.

At operation 404, a first current dynamic input for a first golf shot, or set of golf shots, that are made without a change to that current static input received at operation 402. For example, a single shot may be made with a golf club identified in the current static input or a series of shots may be made with that golf club. The first current dynamic input received at operation 404 may be for the single shot or for the series of shots. The first current dynamic input may include any combination of the dynamic inputs identified above. As also discussed above, the first current dynamic input may be received from the performance tracking devices.

At operation 406, a trained machine-learning model is executed based on the received first current dynamic input and current static input. Executing the trained machine-learning model generates first predicted equipment data, including at least one of first predicted golf club properties or first predicted golf ball properties for the golfer. The trained machine-learning model has been trained from a set of prior dynamic inputs, prior static inputs, and at least one of prior golf club swing characteristics or prior golf ball flight characteristics. As an example, the trained machine-learning model may be a machine-learning model that was trained using method 300 discussed above and depicted in FIG. 3. At operation 408, the first predicted equipment properties are displayed. For instance, at least one of the first predicted golf club properties or the first predicted golf ball properties for the golfer may be displayed.

Executing the trained machine-learning model based on the received first current dynamic input and current static input in operation 406 may also include generating a closest tour professional to the golfer based on the golfer's current static input and first current dynamic input. The machine-learning model may also generate comparison statistics between the golfer's first current dynamic input and current static input and the tour professional's static inputs and dynamic inputs. As such, the golfer will be able to identify where, and how, the golfer and the golfer's swing and shot differ from that of the tour professional. In addition, the machine-learning model may also generate predicted equipment for the golfer to more closely attain the swing and shot attributes of the tour professional. For example, a recommendation may include that the golfer should use the equipment that the identified tour professional uses. Additional recommendations may also be generated for instructing the golfer on how to change the golfer's swing to more closely match that of the identified tour professional. These generated outputs may also be displayed in operation 408.

The trained machine-learning model may also be reinforced based on additional inputs or feedback in optional operations 410 and 412. At operation 410, feedback regarding the first predicted equipment properties is received. The feedback may be received via an input device of the golf equipment identification system. The feedback may either confirm or reject the first predicted equipment properties. For example, a fitting specialist or the golfer may review the first predicted equipment properties to determine if those predicted equipment properties are accurate based on their experience. If the first predicted equipment properties are determined to be accurate, the feedback may be in the form of a confirmation input that confirms the first predicted golf club properties and/or the first predicted golf ball properties. If the first predicted equipment properties are determined to be inaccurate, the feedback may be in the form of a rejection input that rejects the first predicted golf club properties and/or the first predicted golf ball properties. Where the feedback is a rejection, the feedback may also include adjusted first predicted golf club properties and/or adjusted first predicted golf ball properties that the fitting specialist deems accurate.

At operation 412, the feedback received in operation 410 is used to reinforce the trained machine-learning model. For instance, where the feedback is a confirmation input, the trained machine-learning model is positively reinforced. Where the feedback is a rejection input, the trained machine-learning model is negatively reinforced and the adjusted first predicted golf club properties and/or adjusted first predicted golf ball properties may be used to further tune or train the trained machine-learning model. The reinforcement training of the trained machine-learning model may also be based on the current static input, the first current dynamic input, the first predicted golf club properties, and/or the first predicted golf ball properties.

In some examples, upon receiving the first predicted equipment properties, the golfer may take several shots with the predicted equipment properties to receive further equipment predictions and/or confirm the first predicted equipment properties are well-suited for the golfer. In such examples, method 400 flows to operation 414, where the current static input is updated based on the first predicted equipment properties. For instance, the golf-equipment characteristic of the current static input is updated to match the first predicted equipment properties as the golfer is now using golf equipment having such properties.

At operation 416, a second current dynamic input for an additional or second golf shot, or set of golf shots, are made with golf equipment that matches the updated current static input updated at operation 414. For example, a single shot may be made with a golf club and/or ball identified in the updated current static input or a series of shots may be made with that golf club and/or ball. The additional or second current dynamic input received at operation 416 may be for the single shot or for the series of shots. The second current dynamic input may include any combination of the dynamic inputs identified above. As also discussed above, the second current dynamic input may be received from the performance tracking devices.

At operation 418, the trained machine-learning model is executed based on the received additional or second current dynamic input and the updated current static input. Executing the trained machine-learning model generates new or second predicted equipment data, including new or second predicted golf club properties and/or new or second predicted golf ball properties for the golfer. At operation 420, the new or second predicted equipment properties are displayed. For instance, at least one of prior golf club swing characteristics or prior golf ball flight characteristics may be displayed. Executing the trained machine-learning model based on the received second current dynamic input and the updated current static input in operation 418 may also include generating a closest tour professional to the golfer based on the golfer's second current dynamic input and the updated current static input. The machine-learning model may also generate comparison statistics between the golfer's second current dynamic input and the updated current static input and the tour professional's static inputs and dynamic inputs. In addition, the machine-learning model may also generate predicted equipment for the golfer to more closely attain the swing and shot attributes of the tour professional. Additional recommendations may also be generated for instructing the golfer on how to change the golfer's swing to more closely match that of the identified tour professional. Additional data regarding whether the golfer is getting closer or further from the tour professional between the first set of golf shots and the second set of golf shots may also be generated. These generated outputs may also be displayed in operation 420.

Reinforcement of the trained machine-learning model may again happen at optional operations 422 and 424. At operation 422, feedback regarding the second predicted equipment properties is received. The feedback may be received via an input device of the golf equipment identification system, and the feedback may either confirm or reject the second predicted equipment properties. For example, a fitting specialist or the golfer may review the second predicted equipment properties to determine if those predicted equipment properties are accurate based on his/her experience. If the second predicted equipment properties are determined to be accurate, the feedback may be in the form of a confirmation input that confirms the second predicted golf club properties and/or the second predicted golf ball properties. If the second predicted equipment properties are determined to be inaccurate, the feedback may be in the form of a rejection input that rejects the second predicted golf club properties and/or the second predicted golf ball properties. Where the feedback is a rejection, the feedback may also include adjusted second predicted golf club properties and/or adjusted second predicted golf ball properties that the fitting specialist deems accurate.

At operation 424, the feedback received in operation 422 is used to reinforce the trained machine-learning model. For instance, where the feedback is a confirmation input, the trained machine-learning model is positively reinforced. Where the feedback is a rejection input, the trained machine-learning model is negatively reinforced and the adjusted second predicted golf club properties and/or adjusted second predicted golf ball properties may be used to further tune or train the trained machine-learning model. The reinforcement training of the trained machine-learning model may also be based on any combination of the received current static input, the updated current static input, the first current dynamic input, the second current dynamic input, the first predicted golf club properties, the second predicted golf properties, the first predicted golf ball properties, or the second predicted golf ball properties.

Operations 414-424 may then repeat using the second predicted equipment properties to update the static input. Those operations may also continually repeat for future or different predictions as well. In addition, while the method 400 is generally discussed with reference to two sets of golf shots, on will appreciate the present technology may be used for a variety of different golf shots using different golf equipment to produced predicted golf equipment.

Many of the embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. One should appreciate that the present technology captures physical signals, such as electromagnetic waves in the infrared, visible, and/or radio-frequency spectrum, and transforms those physical signals into digital data capable of being stored in memory and processed by one or more processors. Further, as used herein and in the claims, the phrase "at least one of element A, element B, or element C" is intended to convey any of: element A, element B, element C, elements A and B, elements A and C, elements B and C, and elements A, B, and C.

Although specific embodiments are described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system for identifying golf equipment, the system comprising:
   a performance tracking device, wherein the performance tracking device includes at least one of an optical sensor system or a radar sensor system for tracking a golf club swing, wherein the performance tracking device is configured to generate golf club swing characteristics of the golf club swing;
   a display operatively connected to the performance tracking device;
   an input device for receiving static input; and
   at least one processor and memory operatively connected to the performance tracking device, the display, and the input device, the memory storing instructions that, when executed by the at least one processor, cause the system to perform a set of operations comprising:

receive, from the performance tracking device, current dynamic input for a golf shot from a golfer, wherein the current dynamic input includes golf club swing characteristics for the golf shot;

receive, via the input device, current static input for the golfer, wherein the current static input includes one or more golf-equipment characteristics;

execute a trained machine-learning model based on the received current dynamic input and current static input to generate predicted golf club properties, wherein the trained machine-learning model has been trained from a set of prior dynamic inputs and prior static inputs; and display, on the display, the predicted golf club properties.

2. The system of claim 1, wherein the one or more golf-equipment characteristics includes at least one of a club head model, a club head lie, or a club head loft.

3. The system of claim 1, wherein the one or more golf-equipment characteristics includes at least one of a shaft flex, a shaft length, or a shaft torque.

4. The system of claim 1, wherein the one or more golf-equipment characteristics includes at least one of club head grind and club head bounce.

5. The system of claim 1, wherein the golf club swing characteristics include golf club speed.

6. The system of claim 1, wherein the golf club swing characteristics include an impact location.

7. The system of claim 1, wherein the golf club swing characteristics include a dynamic loft.

8. The system of claim 1, wherein the golf club swing characteristics include a face angle.

9. The system of claim 1, wherein the golf club swing characteristics include an attack angle.

10. The system of claim 1, wherein the performance tracking device, display, input device, and the processor are incorporated into a single housing.

11. The system of claim 10, wherein the performance tracking device includes a camera of a smart phone and the input device and the display are part of a touchscreen of the smart phone.

12. A method, executed by one or more processors, for identifying golf equipment, the method comprising:

receiving static input, wherein the static input includes at least one golf-equipment characteristic;

while a golf club is being swung by a golfer during a first swing, tracking, by a performance tracking device, swing characteristics of the golf club for the first swing;

executing, by the one or more processors, a trained machine-learning model based on the received static input and the tracked swing characteristics for the first swing to generate first predicted golf club properties for the golfer, wherein the trained machine-learning model has been trained from a set of prior static inputs and prior golf club swing characteristics; and displaying, on a display operatively connected to the one or more processors, the first predicted golf club properties for the golfer.

13. The method of claim 12, wherein the method further comprises:

while a golf club is being swung by the golfer during a second swing, tracking, by the performance tracking device, swing characteristics of the golf club for the second swing;

updating, by the one or more processors, the static input for the golfer based on the golf club having the first predicted golf club properties;

executing, by the one or more processors, the trained machine-learning model based on the swing characteristics of the golf club for the second swing and the updated static input to generate second predicted golf club properties; and displaying, on the display, the second predicted golf club properties.

14. The method of claim 12, wherein the swing characteristics of the golf club for the first swing include a swing path characteristic.

15. The method of claim 12, wherein the trained machine-learning model generates an identification of a tour professional that most closely matches the received static input and the swing characteristics of the golf club for the first swing.

16. The method of claim 12, wherein the swing characteristics of the golf club for the first swing include a club head speed characteristic.

17. The method of claim 12, wherein the swing characteristics of the golf club for the first swing include a dynamic loft.

18. The method of claim 12, wherein the swing characteristics of the golf club for the first swing include a face angle.

19. A system for identifying golf equipment, the system comprising:

a housing that houses:
  a camera;
  a touchscreen;
  a processor operatively connected to the camera and the touchscreen; and
  memory storing instructions that, when executed by the processor, cause the system to perform a set of operations comprising:
    generate, based on data received from the camera, current dynamic input for a golf shot from a golfer, wherein the current dynamic input includes golf club swing characteristics for a golf shot;
    receive, via the touchscreen, current static input for the golfer, wherein the current static input includes one or more golf-equipment characteristics;
    execute a trained machine-learning model based on the current dynamic input and current static input to generate predicted golf club properties, wherein the trained machine-learning model has been trained from a set of prior dynamic inputs and prior static inputs; and
    display, on the touchscreen, the predicted golf club properties.

20. The system of claim 19, wherein:
the one or more golf-equipment characteristics includes at least one of a club head model, a club head lie, a club head loft, a shaft flex, a shaft length, a shaft torque, a club head grind, or a club head bounce; and
the golf club swing characteristics include at least one of golf club speed, impact location, dynamic loft, face angle, or attack angle.

* * * * *